Feb. 26, 1963   D. BARNHARD   3,079,049
GUIDE LINE MARKER ASSEMBLY
Filed June 5, 1961
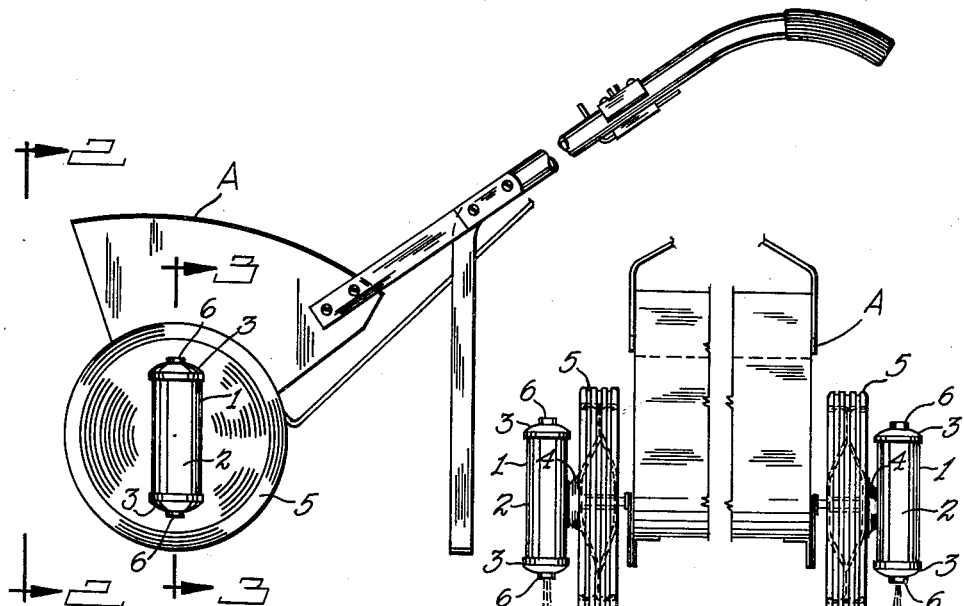
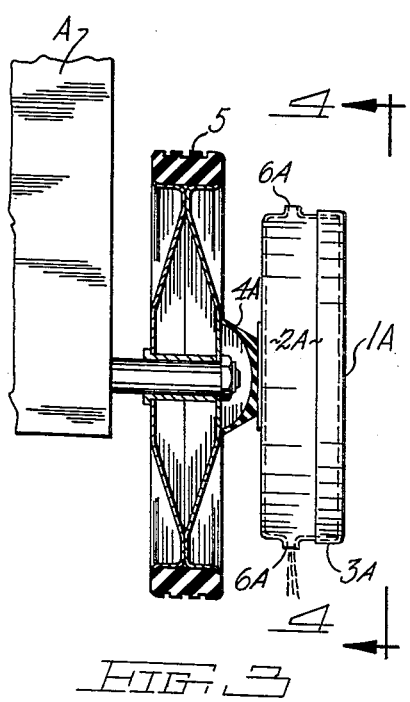
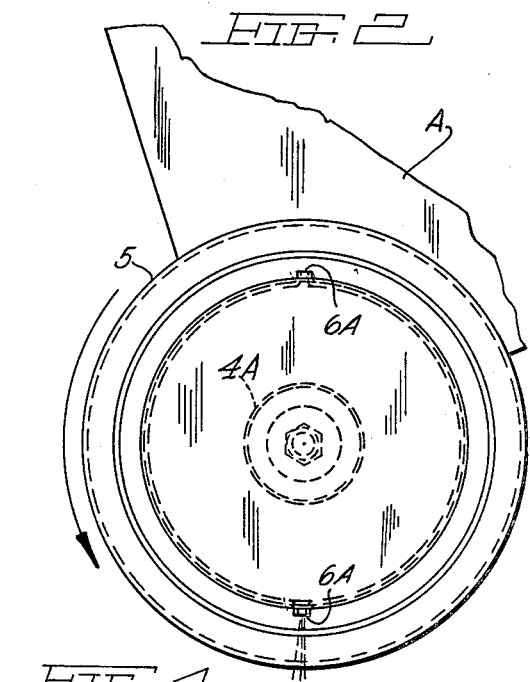
INVENTOR.
DORN BARNHARD
BY
CHARLES B. McDONALD
AGENT United States Patent Office 3,079,049
Patented Feb. 26, 1963

3,079,049
GUIDE LINE MARKER ASSEMBLY
Dorn Barnhard, 2196 Lee Road,
Cleveland Heights 18, Ohio
Filed June 5, 1961, Ser. No. 114,852
3 Claims. (Cl. 222—169)

This invention relates to a line marker assembly which is adapted to be removably attached to a rotatable ground supported wheel of conventional lawn equipment such as ordinary type of lawn spreader devices, normally used to apply fertilizer or other powdered chemical materials to lawns, and has for the primary object the provision of an efficient inexpensive line marker assembly having attachment means for securing the assembly to such a wheel for rotation therewith about a common axis to deposit dots of lime or other powdered material to form a guide line of intermittent dots, to guide the operator of the lawn spreader and thereby prevent overlapping of the material being applied, which with some materials could cause considerable damage by applying to some areas more than the recommended amount.

Another object of this invention is to provide an assembly that will form a true guide line around curved and irregular areas such as found around flower beds, pools, and hedges.

With these and other objects in view, the invention consists in certain novel features of construction, combination and arrangement of parts to be hereinafter more fully described and claimed, it being understood that changes in the invention as herein disclosed can be made within the scope of what is claimed, without departing from the spirit of the invention.

Further objects of the present invention will be evident from the following description of the invention, as illustrated in the accompanying drawings, in which:

FIG. 1 is a side elevation of a tubular line marker assembly arranged to be attached to the wheels of a well known type of lawn spreader equipment.

FIG. 2 is a front elevation view through lines 2—2 and 3—3 of FIG. 1.

FIG. 3 is a side view of round cup-like line marker assembly mounted on one of the wheels of lawn spreader equipment.

FIG. 4 is an end view of FIG. 3.

Attention is now directed to FIGURES 1 and 2 of the drawing wherein there is illustrated a line marker assembly 1 consisting of a hollow container 2 having a substantially unobstructed interior and at least one opening, a pair being illustrated, that is provided with structure 3 in the form of closure caps and means 4 in the form of a unitary attachment element to secure said line marker assembly 1 to a generally radially projecting substantially planar flange portion of a ground wheel 5 of a lawn spreader A with the element 4 preferably being a rubber vacuum cup or a magnet which may be secured to only the exterior of the container 2 at a location thereon which is in alignment with the rotational axis of the wheel 5 by cementing or other well known securing means, including a spring clip fastening means whereby the container 2 and the wheel 5 will rotate about a common axis and the assembly 1 may be quickly removed when emptied and replaced. The container 2 and the structure 3 of the assembly 1 define a substantially cylindrical member having a side wall portion and spaced apart end wall portions. In the embodiment of the invention as illustrated in FIGURES 1 and 2 of the drawing, the end portions are formed by the closure caps which maintain the marking material within the interior of the container 2 with the closure caps also being provided with openings 6, which permit the discharge of lime or other powder-like material with two discharges of such powder with each revolution of the wheel 5; it being understood that liquid marking material may also be used. If desired to provide a guide line for straight lines across and back over a lawn, the line marker assembly 1 may be attached to each ground wheel 5 of the lawn equipment A which supports and carries the spreader. Also, it may be desired to completely close one end of the container 2 and use only one closure cap structure 3 with the respective opening 6. This will space each dot of marking material farther apart.

One of the closure caps of the structure 3 is arranged to be easily removed from the container 2 to provide means whereby a new supply of marker material may be received in the container 2, or the container may be arranged to be discarded entirely and replaced by a new container filled with the desired marking material.

In the operation of the instant line marker device, the removable closure cap structure 3 is removed; the container 2 is filled with marking material. The line marker assembly 1 is attached to the ground wheel 5 by the element 4. As the operator moves the spreader equipment A forward, the ground wheel 5 of the spreader rotates, moving the line marker assembly 1 from end to end, with each revolution of the wheel 5. As the open end of the closure cap structure 3 is pointed downward, two dots of the powder-like material are discharged from the openings 6, thereby forming an intermittent dotted guide line. The line marker assembly 1–A shown in FIGS. 3 and 4 is cup shaped, and is provided with a container 2–A having a substantially unobstructed interior and structure in the form of a cover 3–A which define a substantially cylindrical member having a side wall portion and end portions with the side wall portion having a plurality of discharge openings 6–A arranged to be attached to the wheel 5 of a lawn spreader by a unitary attachment element 4–A, vacuum cup, spring clip, magnet or any other fastening means.

In one form of this invention it is contemplated that the marker material, either in powder or liquid form, will be sealed in the containers which will be arranged to be secured to the ground wheels of lawn spreaders by a spring clip or other means, which permits quick and easy attachment and removal of the containers, whereby the empty container may be removed and thrown away and replaced by a new container. This arrangement provides means whereby the containers may be filled and sealed at the factory and made available at all garden supply distributors, and eliminates the problem of the spreader operator having to refill the containers with the marking material as they become emptied.

Having thus described this invention, what I claim as new is:

1. In combination with conventional type lawn equipment having a rotatable ground wheel provided with a substantially planar flange portion which is disposed generally radially relative to the rotational axis of the wheel, the improvement comprising in combination with the flange portion of the wheel,
   an assembly adapted to be attached to the flange portion of the wheel for rotation therewith about an axis which is common to the rotational axis of the wheel and effective to apply a guide line along the ground,
   said assembly comprising
   a substantially cylindrical container defined by a side wall portion and end wall portions,
   said end wall portions each being provided with an opening therein,
   structure for maintaining marking material within the container by closing the openings in the end wall portions thereof and for permitting periodic discharge of such marking material therefrom by opening at least one of the openings, and a unitary attachment element carried only by the container for removably securing the container directly to the flange portion of the wheel, said element being disposed on the exterior of the side wall portion of the container at a location thereon which is intermediate the end wall portions thereof and which is in alignment with the rotational axis of the wheel.

2. The assembly as set forth in claim 1 wherein said element is a magnet.

3. The assembly as set forth in claim 1 wherein said element is a vacuum cup.

References Cited in the file of this patent

UNITED STATES PATENTS

| | | |
|---|---|---|
| 139,732 | Paterson | June 10, 1873 |
| 892,962 | Lancaster et al. | July 7, 1908 |
| 946,561 | Prudhomme | Jan. 18, 1910 |

FOREIGN PATENTS

| | | |
|---|---|---|
| 476,930 | Italy | Jan. 5, 1953 |